United States Patent
Hashimoto et al.

(10) Patent No.: US 6,575,515 B2
(45) Date of Patent: Jun. 10, 2003

(54) AUTOMOTIVE BODY STRUCTURE

(75) Inventors: Takashi Hashimoto, Tokyo-to (JP); Isao Itoi, Tokyo-to (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/177,162

(22) Filed: Jun. 24, 2002

(65) Prior Publication Data

US 2003/0011212 A1 Jan. 16, 2003

(30) Foreign Application Priority Data

Jul. 10, 2001 (JP) .................................. 2001-208765

(51) Int. Cl.[7] ..................... B62D 33/06; B62B 33/02
(52) U.S. Cl. ................. 296/26.11; 296/188; 296/146.6; 296/146.11; 296/190.11
(58) Field of Search ................... 296/26.08, 26.11, 296/188, 189, 57.1, 146.6, 146.11, 190.11, 183, 68

(56) References Cited

U.S. PATENT DOCUMENTS

| | | | | |
|---|---|---|---|---|
| 4,157,201 A | * | 6/1979 | Collins et al. | 296/156 |
| 5,934,727 A | * | 8/1999 | Storc et al. | 296/26.11 |
| 6,260,916 B1 | * | 7/2001 | Hunt | 296/190.11 |
| 6,276,751 B1 | * | 8/2001 | Ikarashi et al. | 296/190.11 |
| 6,398,291 B1 | * | 6/2002 | Reusswig et al. | 296/190.11 |
| 6,416,104 B1 | * | 7/2002 | Fisher et al. | 296/190.11 |
| 6,419,299 B1 | * | 7/2002 | Pyo | 296/190.11 |
| 6,447,051 B1 | * | 9/2002 | Lukomskiy | 296/190.11 |
| 6,450,566 B1 | * | 9/2002 | Hong | 296/190.11 |
| 6,481,772 B1 | * | 11/2002 | Tenn | 296/26.11 |
| 6,505,872 B2 | * | 1/2003 | Hong | 296/26.11 |
| 2002/0014785 A1 | * | 2/2002 | Sotiroff et al. | 296/146.6 |
| 2003/0025352 A1 | * | 2/2003 | Duffy | 296/190.11 |

FOREIGN PATENT DOCUMENTS

JP          2000-185669          7/2000

* cited by examiner

Primary Examiner—D. Glenn Dayoan
Assistant Examiner—Jason Morrow
(74) Attorney, Agent, or Firm—Smith, Gambrell & Russell, LLP

(57) ABSTRACT

An automotive body structure includes a body (14) having a front body section (14a) defining a passenger compartment (2) and a rearbody section (14b) defining a cargo bed (4), and a division panel (6) dividing the passenger compartment (2) and the cargo bed (4) from each other. A ridge (20) prevents the direct collision of a cargo (X) accommodated in the cargo bed (4) against the division panel (6). A reinforcing member (32) restrains the division panel (6) from being bent by a moment of force applied thereto by the collision of the cargo (X) against the division panel (6). Support means (34) resiliently controls the forward movement of a predetermined part of a pivotal shaft (12) when the cargo (X) strikes against the division panel (6). The ridge (20), the reinforcing member (32) or the support means (34) of the automotive body structure protects the division panel (6) from damage.

19 Claims, 7 Drawing Sheets

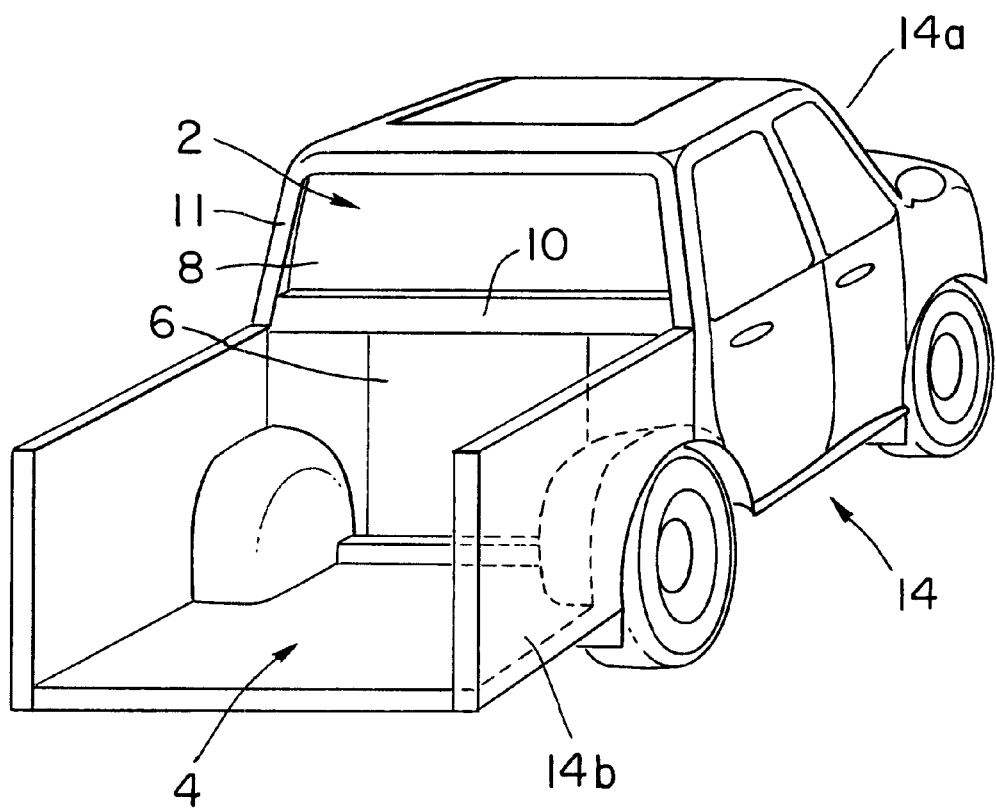
F I G. 1

AUTOMOTIVE BODY STRUCTURE

BACKGROUND OF THE INVENTION

1. Field of the Invention

The present invention relates to an automotive body structure for a pickup type truck, and particularly to a movable separation panel between a passenger compartment and a cargo bed.

2. Description of the Related Art

An automotive body structure for a pickup type truck is provided in a rear portion with a movable division panel dividing a passenger compartment defined by a front body section, and a cargo bed defined by a rear body section from each other (JP-A No. 185669/2000). The division panel can turn on its base part as a pivot. When the division panel is turned on the base part toward the cargo bed, the passenger compartment is opened to the cargo bed to enlarge a space available for accommodating cargo.

The shock resistance of the division panel of the automotive body structure, however, is insufficient and, in some cases, the closed division panel is damaged by a cargo forced to move forward in the cargo bed when the pickup type truck decelerates.

SUMMARY OF THE INVENTION

It is an object of the present invention to provide an automotive body structure having a rear body section defining a cargo bed, including a division panel resistant to shocks that may be exerted thereon by cargo that moves in the cargo bed.

According to the present invention, the automotive body structure includes a body having a front body section defining a passenger compartment and a rear body section defining the cargo bed; the division panel dividing the passenger compartment and the cargo bed from each other, having a first end part supported on the body, and can turn on the first end part supported on the body; and a panel-protecting device for protecting the division panel from damage.

In the automotive body structure according to the present invention, the panel-protecting device may include a ridge rising from a part of a surface of a deck included in the rear body section near the division panel.

When a cargo placed in the cargo bed of the rear body section is forced to move forward as the automobile decelerates, a lower part of the cargo strikes against the ridge. If the cargo is moved forward at a relatively high speed, the cargo strikes against the division panel has struck against the ridge. Since the direct collision of the cargo against the division panel can be avoided, the possibility of damaging the division panel is reduced.

In the automotive body structure according to the present invention, a second end part opposite to the first end part of the division panel may be fixedly held by a holding part of the body when the division panel is set at a closing position, and the panel-protecting device may include a reinforcing member included in the division panel near the second end part of the same.

In the automotive body structure according to the present invention, the division panel may include a frame, a pipe laterally extended on the frame, and a bracket extending upward from the frame beyond the pipe, and a reinforcing member may be disposed between the pipe and the bracket.

The first end part of the division panel is supported pivotally on the body, and the second end part of the division panel is fixedly held by the holding part of the body when the division panel is set at the closing position. If a cargo accommodated in the cargo bed strikes against the division panel set at the closing position, the division panel is bent such that a part of the division panel against which the cargo struck is moved toward the passenger compartment and, consequently, a rotation moment acts on the second end part of the division panel. Since the second end part is fixedly held by the holding part, a stress is transmitted to a predetermined part (portion) of the division panel adjacent to the second end part. Since the part of the division panel around the second end part is provided with the reinforcing member, the division panel is resistant to damaging actions.

In the automotive body structure according to the present invention, the first end part of the division panel may be provided with a pivotal shaft having opposite ends supported by first and second hinges on the body.

In the automotive body structure according to the present invention, the panel-protecting device may have support means placed on the body to support the pivotal shaft when the pivotal shaft is bent toward the passenger compartment.

In this automotive body structure, the opposite ends of the pivotal shaft of the division panel are supported by the first and the second hinges on the body. If cargo accommodated in the cargo bed strikes against the division panel, the division panel is bent such that a predetermined part of the pivotal shaft between the first and the second hinges is moved toward the passenger compartment. Since the support means supports the predetermined part of the pivotal shaft so as to resist the movement toward the passenger compartment of the predetermined part of the pivotal shaft, the predetermined part is restrained from moving toward the passenger compartment and, consequently, the division panel is resistant to damaging actions.

In the automotive body structure according to the present invention, the support means may have a belt having one end fixed to the body and the other end fixed to the division panel, and extending in front of the pivotal shaft.

In the automotive body structure according to the present invention, the opposite ends of the belt may be fastened to the body and the division panel with bolts, respectively, and each of the opposite ends of the belt may be provided with a plurality of bolt holes.

If a cargo accommodated in the cargo bed strikes against the division panel, and the predetermined part of the pivotal shaft is moved forward, i.e., toward the passenger compartment, by a distance exceeding a predetermined distance, the belt supports the predetermined part and the force exerted on the pivotal shaft is distributed to and absorbed by the belt and, consequently, the movement of the predetermined part toward the passenger compartment is limited.

In the automotive body structure according to the present invention, the support means may include a bracket fixed to the body and surrounding the pivotal shaft, and a bushing interposed between the bracket and the pivotal shaft.

If the cargo accommodated in the cargo bed strikes against the division panel, and pushes a predetermined part of the pivotal shaft forward, i.e., toward the passenger compartment, by a distance exceeding a predetermined distance, the predetermined part of the pivotal shaft is pressed against the bushing. Since the bushing is interposed between the bracket and the predetermined part of the pivotal shaft, the bushing exerts a resilient force on the predetermined part of the pivotal shaft in a direction opposite to a direction in which the predetermined part of the pivotal shaft was pushed by the cargo, so that the predetermined part is pushed rearward. Thus, the predetermined part is restrained resiliently from moving toward the passenger compartment.

BRIEF DESCRIPTION OF THE DRAWINGS

FIG. 1 is a perspective view of an automobile provided with an automotive body structure in a preferred embodiment according to the present invention;

DESCRIPTION OF THE PREFERRED EMBODIMENTS

Figure 2:
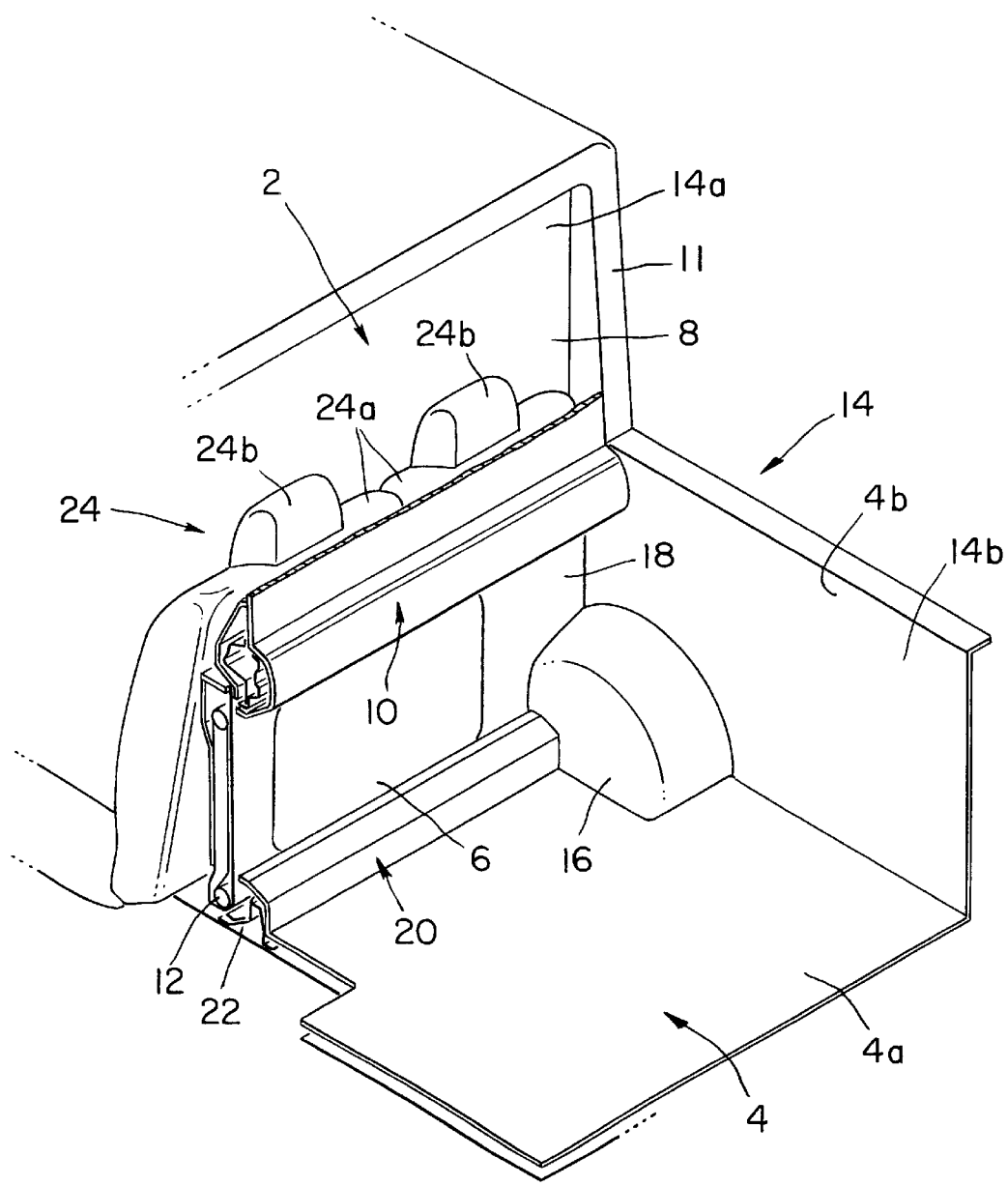
FIG. 2 is a perspective view of a principal part of the automotive body structure in the preferred embodiment.

An automotive body structure in a preferred embodiment according to the present invention will be described with reference to the accompanying drawings, in which parts are denoted by the same reference characters and the duplicate description thereof will be omitted.

FIG. 1 is a perspective view of an automobile provided with an automotive body structure in a preferred embodiment according to the present invention and FIG. 2 is a perspective view of a principal part of the automotive body structure in the preferred embodiment. The automotive body structure is designed for a pickup type truck. The automotive body structure has a body 14 having a front body section 14a defining a passenger compartment 2 and a rear body section 14b defining a cargo bed 4, and a division panel 6 disposed in the rear body section 14a of the body 14 so as to divide the passenger compartment 2 and the cargo space 4 from each other. A rear windshield 8 is disposed above the division panel 6. A support beam (upper bulk head) 10 is extended laterally between the division panel 6 and the rear windshield 8. C (center) pillars 11 are disposed at the opposite side ends of the rear windshield 8, respectively.

The division panel 6 divides the passenger compartment 2 and the cargo bed 4 from each other. A pivotal shaft 12 is extended laterally on a lower end part (one end part) 6x of the division panel 6. The division panel 6 is supported on the body 14 for turning on the pivotal shaft 12. The passenger compartment 2 is opened into the cargo bed 4 when the division panel 6 is turned away from the passenger compartment 2 on the pivotal shaft 12. Naturally, the division panel 6 may be supported so as to be turnable toward the cargo bed 4. The pivotal shaft 12 may be extended on an upper end part (the other end part) of the division panel 6.

The rear body section 14b defining the cargo bed 4 has a deck 4a having a deck surface, side walls (quarter panels) 4b standing on the opposite side ends of the deck 4a. Tire houses 16 are formed in parts near the passenger compartment 2 of the side walls 4b, respectively. The outer surface of the turnable division panel 6, and the outer surfaces of side bulk heads 18 disposed at the opposite side ends of the division panel 6 form the front inner surface of the cargo bed 4. A lower bulk head (ridge) 20 and a rear cross member 22 are extended laterally along the intersection of the front inner surface of the cargo bed 4, and the deck 4a. The lower bulkhead (ridge) 20 is a component of a panel-protecting device for protecting the division panel, which will be described later.

Two rear seats 24 are disposed in the passenger compartment 2. Each of the rear seat 24 has a seat back 24a and a head rest 24b. A single bench seat may be used instead of the two rear seats 24.

Figure 3:
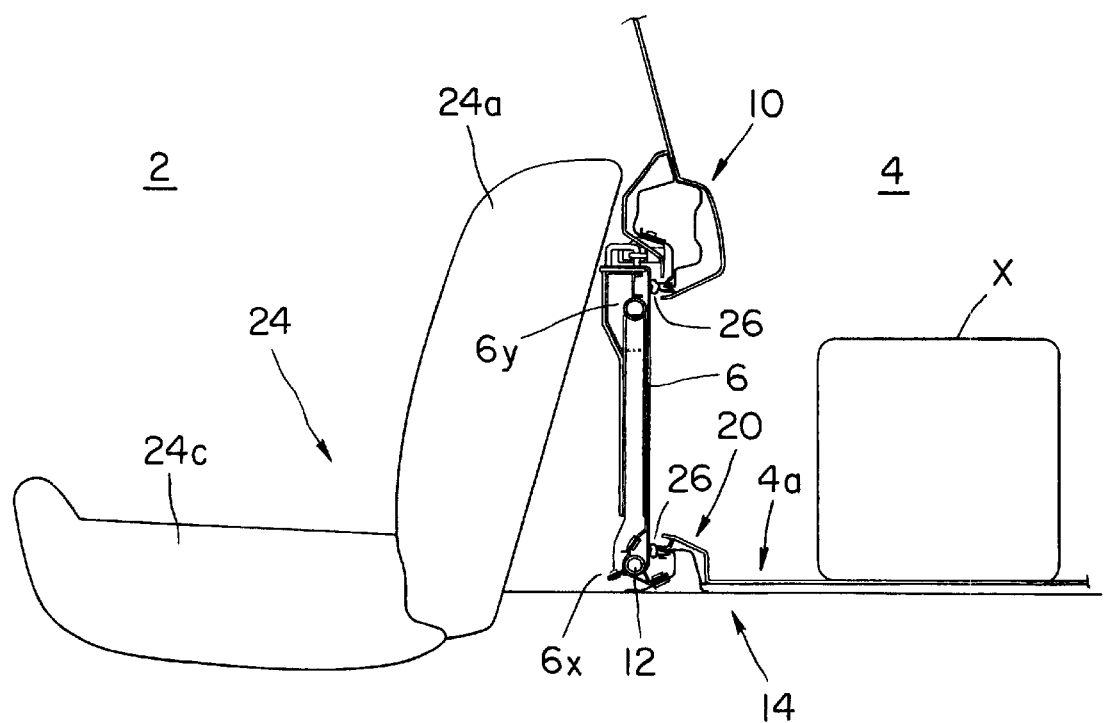
FIG. 3 is a side elevation of a part around a rear seat of the automotive body structure, in which a division panel included in the automotive body structure in the preferred embodiment is set at a closing position.

FIG. 3 is a side elevation of a part, around the rear seat 24, of the automotive body structure in a state where the division panel 6 is set at a closing position. The seat backs 24 are standing up from seat cushions 24c so that passengers can be seated on the rear seats 24. The division panel 6 is disposed behind the seat backs 24a to divide the passenger compartment 2 from the cargo bed 4. A sealing member 26 is attached to a part of the outer side of the division panel 6 so as to be in a close contact with an outer part of the body 14. The division panel 6 is supported on the body 14 so as to divide the passenger compartment 2 and the cargo bed 4 from each other and so as to be turnable on the pivotal shaft 12. The ridge 20 is disposed on the deck surface of the deck 4a in the cargo bed 4 behind the pivotal shaft 12, preferably, contiguously with the pivotal shaft 12. The ridge 20 protrudes upward from the deck surface of the deck 4a.

Figure 4:
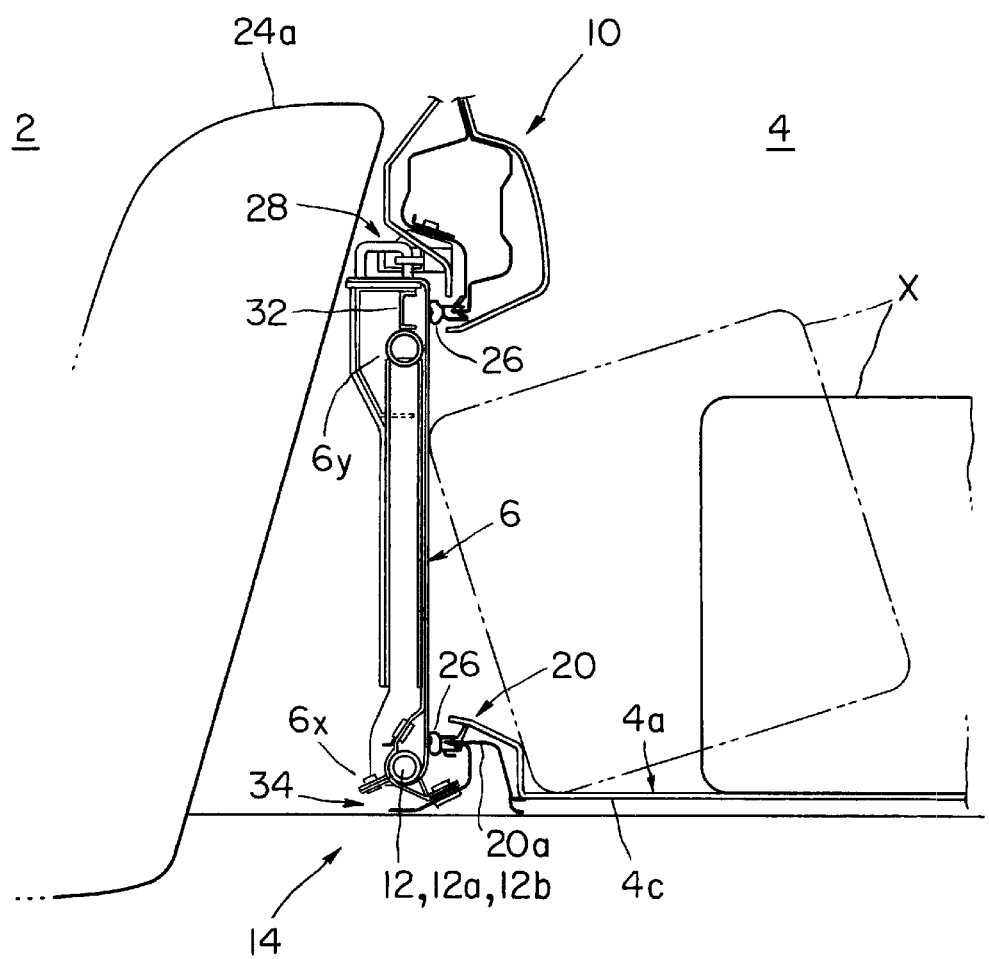
FIG. 4 is an enlarged side elevation of a part around a rear seat of the automotive body structure, in which the division panel included in the automotive body structure in the preferred embodiment is set at the closing position.

FIG. 4 is an enlarged side elevation of a part, around the rear seats 24, of the automotive body structure, in which the division panel 6 is set at the closing position. If a cargo X placed on the deck 4a in the cargo bed 4 moves forward when the pickup type truck decelerates, a lower part of the cargo X strikes against the ridge 20. If the cargo X moves forward at a high speed, the cargo X will strike against the division panel 6 as indicated by two-dot chain lines after striking against the ridge 20. Since the direct collision of the cargo X against the division panel 6 can be thus avoided, the division panel 6 is protected from damage.

The deck 4a is a part of the body 14 formed by a sheet metal, and the deck surface of the deck 4a is covered with a formed resin sheet 4c. The ridge 20 includes a protrusion 20a of a metal, and a part of the formed resin sheet 4c covering the protrusion 20a. The automotive body structure is provided with a surfacing material like a resin. For example, the support beam 10 is covered with a resin trim.

The division panel 6 turns on hinges attached to the opposite ends of the pivotal shaft 12. The upper end part 6y, i.e., an end part opposite to the lower end part 6x of the division panel 6 on the side of the pivotal shaft 12 is fixedly held by a latch 28 attached to the body 14 when the division panel 6 is set at the closing position.

Figure 5:
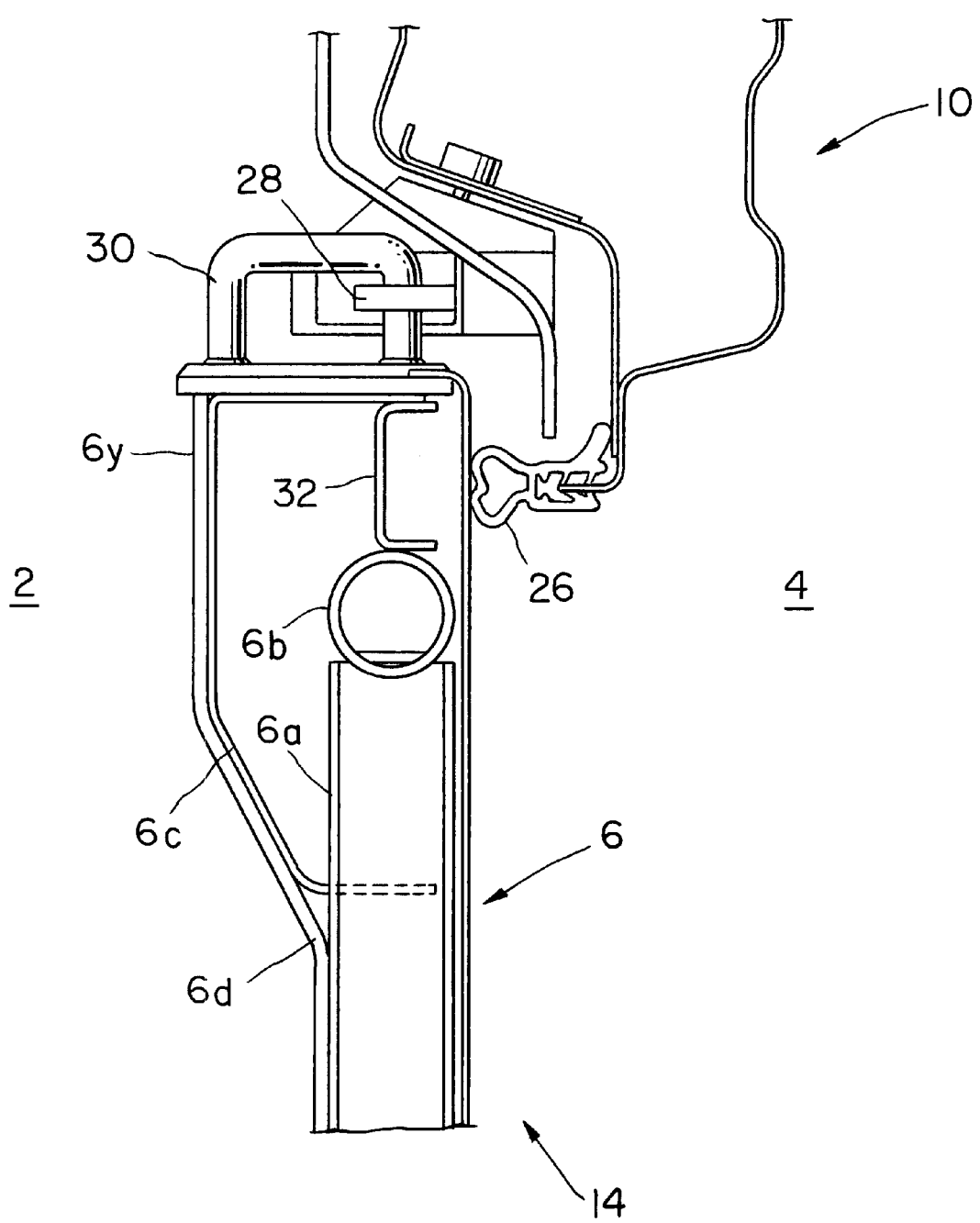
FIG. 5 is an enlarged sectional view of members around an upper end part of the division panel included in the automotive body structure in the preferred embodiment.

FIG. 5 is an enlarged sectional view of members around the upper end part 6y of the division panel 6. FIG. 5 shows a middle part of the division panel 6 with respect to width. The latch 28 engages a U-shaped shackle 30 of a metal attached to the upper end 6y of the division panel 6 when the division panel 6 is set at the closing position. When the U-shaped shackle 30 is pressed against the latch 28, the latch 28 engages the U-shaped shackle 30 to hold the division panel 6 fixedly at the closing position. When the latch 28 is unlocked, the shackle 30 is disengaged from the latch 28.

The division plate 6 is provided with a reinforcing member (panel-protecting device) 32 in a predetermined part thereof on the side of the pivotal shaft 12 with respect to the shackle 30, i.e., below the shackle 30, more preferably, a rear part in a section of the division panel 6 corresponding to the rear leg of the shackle 30.

The division panel 6 has a frame 6a of a metal or a resin, a metal pipe 6b attached to the upper end of the frame 6a extending along the width of the frame 6a, a bracket 6c extending from a middle part, with respect to width, of the frame 6a to a level above the metal pipe 6b, and a housing shell 6d housing the frame 6a, the metal pipe 6b and the bracket 6c. The shackle 30 is fixed to an upper part of the bracket 6c.

The shackle 30 of the division panel 6 is fixedly held in place by the latch 28 and the pivotal shaft 12 is supported on a first hinge 12a and a second hinge 12b when the division panel 6 is set at the closing position. If the cargo X accommodated in the cargo bed 4 strikes against the division panel 6 in this state, the division panel 6 is bent and a part of the division panel 6 against which the cargo X struck is moved toward the passenger compartment 2 and, consequently, a rotation moment acts on the shackle 30. Since the shackle 30 is held by the latch 28, stress is transmitted to a predetermined part of the division panel 6 near the shackle 30, i.e., a part between the metal pipe 6b and an upper part of the bracket 6c corresponding to the rear leg of the shackle 30. Since the predetermined part of the division panel 6 is reinforced by the reinforcing member 32 having a U-shaped cross section, the predetermined part of the division panel 6 is resistant to damaging actions. The reinforcing member 32 is fixedly attached to the metal pipe 6b and the upper part of the bracket 6c.

Figure 6:
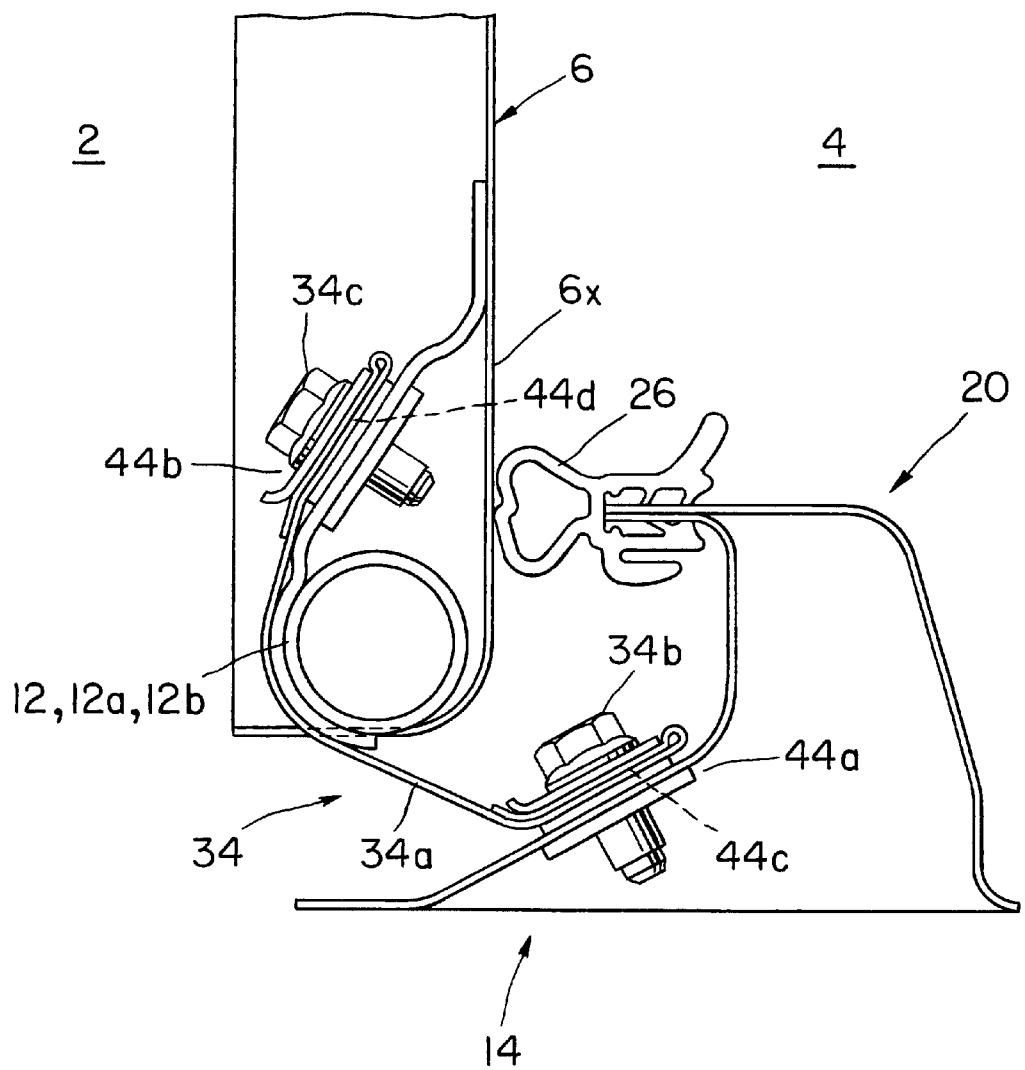
FIG. 6 is the enlarged sectional view of members around a lower end part of the division panel included in the automotive body structure in the preferred embodiment.

The structure of the lower end part 6x of the division panel 6 will be described. FIG. 6 is an enlarged sectional view of a middle part of the lower end part 6x of the division panel 6 with respect to the width. The pivotal shaft 12 in the lower end member of the division panel 6, extends laterally. The first hinge 12a and the second hinge 12b are disposed at positions corresponding to the opposite end parts of the pivotal shaft 12 to support the pivotal shaft 12 for turning. The automotive body structure is provided with a support device (panel-protecting device) 34. When a force tending to bend the pivotal shaft 12 is exerted on the pivotal shaft 12 such that a predetermined part of the pivotal shaft 12 between the first hinge 12a and the second hinge 12b is moved toward the passenger compartment 2, the support device 34 supports the predetermined part of the pivotal shaft 12 to prevent the predetermined part from being moved toward the passenger compartment 2.

The opposite end parts of the pivotal shaft 12 are supported by the first hinge 12a and the second hinge 12b, respectively. If the cargo X accommodated in the cargo bed 4 strikes against the division panel 6 in this state, the pivotal shaft 12 is bent such that the predetermined part (a middle part in this case) of the pivotal shaft 12 between the first hinge 12a and the second hinge 12b is moved toward the passenger compartment 2. The support device 34 supports the predetermined part to resist against the movement of the predetermined part toward the passenger compartment 2. The predetermined part of the pivotal shaft 12 does not need necessarily to be the middle part.

The support device 34 shown in FIG. 6 has a belt 34a extending in front of the pivotal shaft 12. The belt 34a has a lower end part 44a fixed to the body 14 with a bolt 34b, and an upper end part 44b fixed to the division panel 6 with a bolt 34c. The length of the belt 34a between the opposite end parts 44a, 44b is determined so that the belt 34a can bear the load exerted on the pivotal shaft 12 effectively. The length of the belt 34a is changeable so that the belt 34a bears the load for an optimum time period when the predetermined part of the pivotal shaft 12 is moved forward for an optimum time.

A predetermined clearance is formed between the belt 34a and the pivotal shaft 12. When the cargo strikes against the division panel 6 and the predetermined part of the pivotal shaft 12 is moved forward, i.e., toward the passenger compartment 2, by a distance exceeding a predetermined distance, the belt 34a is pressed and stretched by the predetermined part of the pivotal shaft 12.

The lower end part 44a of the belt 34a is provided with a plurality of holes 44c, and the upper end part 44b of the belt 34a is provided with a plurality of holes 44d. The clearance can be formed between the belt 34a and the pivotal shaft 12 by selectively using the holes 44c and 44d when passing the bolts 34b and 34c through those holes to fasten the lower end part 44a and the upper end part 44b of the belt 34 to the body 14 and the division panel 6, respectively. Preferably, the lower end part 44a and the upper end part 44b provided with the holes 44c and 44d has a larger thickness than that of a middle part of the belt 34a. For example, the lower end part 44a and the upper end part 44b may be folded in two or three to increase the thickness of the lower end part 44a and the upper end part 44b.

When the cargo strikes against the division panel 6, the division panel 6 is bent and the predetermined part of the pivotal shaft 12 is moved toward the passenger compartment 2 by a distance corresponding to the clearance, the belt 34a supports the predetermined part of the pivotal shaft 12 and absorbs the load on the pivotal shaft 12. Consequently, the distance of advancement of the division plate 6 can be limited. The time period for which the belt 34a bears the load on the pivotal shaft 12 can be optimized and the distance of advancement of the division panel 6 can be controlled by properly adjusting the effective length of the belt 34a to form a proper clearance between the belt 34a and the pivotal shaft 12. Thus, the division panel 6 is protected from damage.

Figure 7:
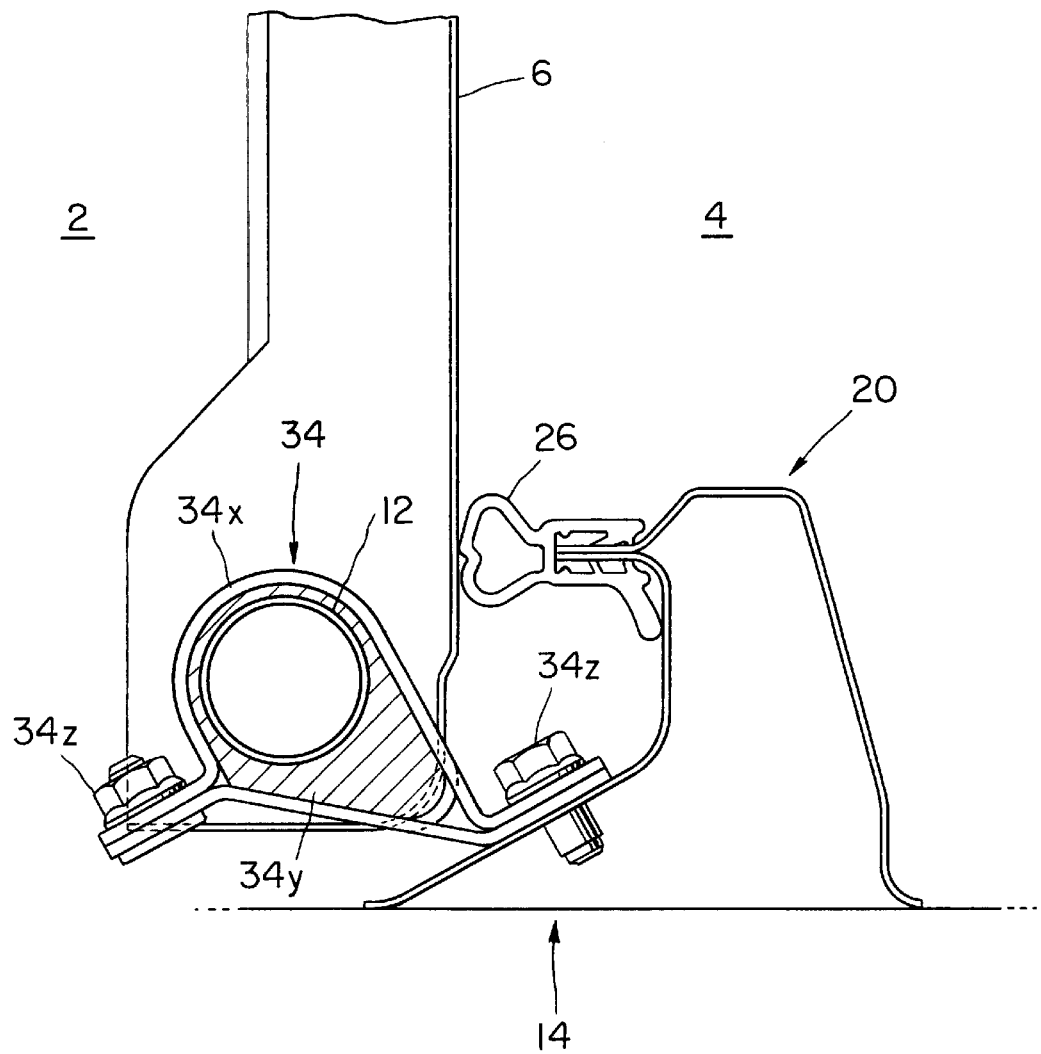
FIG. 7 is the enlarged sectional view of members around a lower end part of the division panel included in the automotive body structure in the preferred embodiment.

Modifications of the support device 34 are possible. A support device 34 in a modification of the support device 34 shown in FIG. 6 will be described with reference to FIG. 7. FIG. 7 is an enlarged sectional view of a lower middle part of the division panel 6 with respect to the width.

The support device 34 shown in FIG. 7 has a bracket 34x surrounding a predetermined part (middle part in this case) of the pivotal shaft 12, and a bushing 34y put on the predetermined part of the pivotal shaft 12 and closely surrounded by the bracket 34x. A clearance is formed between the pivotal shaft 12 and the bushing 34y. The bracket 34x is fastened to the body 14 with a plurality of bolts 34z.

When the cargo strikes against the division panel 6 and the predetermined part of the pivotal shaft 12 is moved forward, i.e., toward the passenger compartment 2, by a distance exceeding the clearance, the predetermined part of the pivotal shaft 12 is pushed forward to press the bushing 34y interposed between the predetermined part of the pivotal shaft 12 and the bracket 34x. The resilience of the bushing 34y thus compressed tends to push the predetermined part of the pivotal shaft 12 rearward. Thus, the movement of the predetermined part of the pivotal shaft 12 toward the passenger compartment 2 is controlled resiliently to protect the division panel 6 from the damage. The support device 34, similarly to the support device 34 provided with the belt 34a, can control the distance of advancement of the division panel 6 properly by forming an optimum clearance between the bushing 34y and the predetermined part of the pivotal shaft 12. The support device 34 provided with the bushing 34y is capable of holding the pivotal shaft 12 more rigidly than the support device 34 provided with the belt 34a, for bearing a large load.

The automotive body structure in the foregoing embodiment is provided with the ridge 20 for avoiding the direct collision of the cargo against the division panel 6, the reinforcing member 32 reinforcing the predetermined part of the division panel 6, and the support device 34 for supporting the pivotal shaft 12 to protect the division panel 6 from the damage.

In the automotive body structure according to the present invention, the direct collision of the cargo accommodated in the cargo bed against the division panel can be prevented, the reinforcing member reinforces the predetermined part of the division panel, and the support device absorbs shocks that act on the division panel. Thus, the division panel is protected from the damage.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An automotive body structure comprising:
   a body having a front body section defining a passenger compartment and a rear body section defining a cargo bed;
   a division panel dividing the passenger compartment and the cargo bed from each other and having a first end part supported on the body so as to be turnable on the first end part supported on the body;
   a panel-protecting device for protecting the division panel from a damage, wherein the panel-protecting device includes a ridge rising from a predetermined portion of a surface of a deck included in the rear body section near the division panel, and wherein the ridge is positioned on the side of the cargo bed with respect to the division panel.

2. The automotive body structure according to claim 1, further comprising:
   a second end part of the division panel fixedly held by a holding part of the body opposite to the first end part when the division panel is set at a closing position, and the panel-protecting device includes a reinforcing member included in the division panel near the second end part thereof.

3. The automotive body structure according to claim 2, wherein
   the division panel includes a frame, a pipe laterally extended on the frame, and a bracket extending upward from the frame beyond the pipe; and the reinforcing member is disposed between the pipe and the bracket.

4. The automotive body structure according to claim 1, wherein
   the first end part of the division panel is provided with a pivotal shaft having opposite ends supported by first and second hinges on the body.

5. The automotive body structure according to claim 4, wherein
   the panel-protecting device has support means placed on the body to support the pivotal shaft when the pivotal shaft is bent toward the passenger compartment.

6. The automotive body structure according to claim 5, wherein
   the support means has a belt having one end fixed to the body and the other end fixed to the division panel and extending in front of the pivotal shaft.

7. The automotive body structure according to claim 6, wherein
   the opposite ends of the belt are fastened to the body and the division panel with bolts, respectively, and each of the opposite ends of the belt is provided with a plurality of bolt holes.

8. The automotive body structure according to claim 5, wherein
   the support means includes a bracket fixed to the body and surrounding the pivotal shaft and a bushing interposed between the bracket and the pivotal shaft.

9. An automotive body structure comprising:
   a body having a front body section defining a passenger compartment and a rear body section defining a cargo bed;
   a division panel dividing the passenger compartment and the cargo bed from each other and having a first end part supported on the body so as to be turnable on the first end part supported on the body;
   a panel-protecting device for protecting the division panel from a damage;
   a second end part, of the division panel fixedly held by a holding part of the body opposite to the first end part when the division panel is set at a closing position, and the panel-protecting device includes a reinforcing member included in the division panel near the second end part thereof; and
   wherein the division panel includes a frame, a pipe laterally extended on the frame, and a bracket extending upward from the frame beyond the pipe; and the reinforcing member is disposed between the pipe and the bracket.

10. An automotive body structure comprising:
    a body having a front body section defining a passenger compartment and a rear body section defining a cargo bed;
    a division panel dividing the passenger compartment and the cargo bed from each other and having a first end part supported on the body so as to be turnable on the first end part supported on the body;
    a panel-protecting device for protecting the division panel from a damage; and
    wherein the first end part of the division panel is provided with a pivotal shaft having opposite ends supported by first and second hinges on the body.

11. The automotive body structure according to claim 10, wherein the panel-protecting device has support means placed on the body to support the pivotal shaft when the pivotal shaft is bent toward the passenger compartment.

12. The automotive body structure according to claim 11, wherein the support means has a belt having one end fixed to the body and the other end fixed to the division panel and extending in front of the pivotal shaft.

13. The automotive body structure according to claim 12, wherein the opposite ends of the belt are fastened to the body and the division panel with bolts, respectively, and each of the opposite ends of the belt is provided with a plurality of bolt holes.

14. The automotive body structure according to claim 11, wherein the support means includes a bracket fixed to the body and surrounding the pivotal shaft and a bushing interposed between the bracket and the pivotal shaft.

15. The automotive body structure according to claim 1 wherein said first end part is turnable relative to a pivot axis extending in a direction common to a lateral direction of elongation in said ridge.

16. The automotive body structure according to claim 15 wherein said first end part is a laterally extending lower end part of said division panel.

17. The automotive body structure according to claim 16 further comprising a latch supported by said body and wherein said division panel includes a second end part which is an upper end part of said division panel positioned opposite to the first, lower end part, and said upper end part is fixedly held by said latch when the division panel is in a closed position.

18. The automotive body structure according to claim 1 wherein said ridge extends laterally from an interior surface portion of a first side wall of said cargo bed to an interior surface portion of a second side wall of said cargo bed.

19. The automotive body structure according to claim 18 wherein the interior surface portion of said first side wall forms part of a tire house formed in said first side wall and the interior surface portion of said second side wall forms part of a second tire house, which second tire house is formed in said second side wall.

* * * * *